May 2, 1961 F. WYSS 2,982,170
MEASURING AND RECORDING APPARATUS FOR DETERMINING
THE COMPONENTS OF A MIXED LIQUID
Filed June 22, 1959
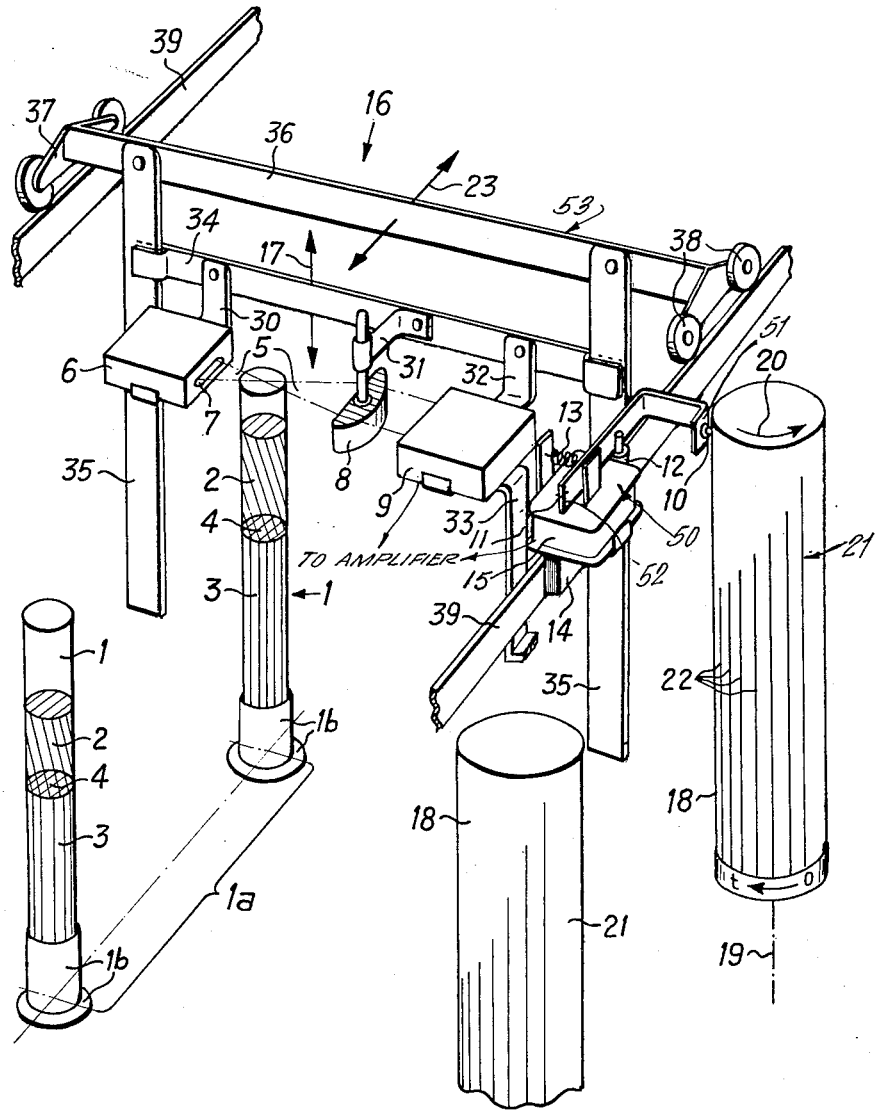
INVENTOR.
FELIX WYSS
BY United States Patent Office 2,982,170
Patented May 2, 1961

2,982,170

MEASURING AND RECORDING APPARATUS FOR DETERMINING THE COMPONENTS OF A MIXED LIQUID

Felix Wyss, 37 Steinweisstrasse, Zurich, Switzerland

Filed June 22, 1959, Ser. No. 821,997

Claims priority, application Switzerland July 9, 1953

7 Claims. (Cl. 88—14)

The present invention relates to a measuring and recording apparatus for the changing separation zone of two different components of a mixed liquid, in particular for the automatic performance and recording of so-called sedimentation rate tests for medical purposes.

A large number of mixed liquids consisting of at least two different components will separate when allowed to stand for some time and the line of separation between a settling component and a non-settling component becomes clearly visible. Usually conclusions may be drawn concerning the mixed liquid and its components from observation of the rate of progress of the settling action, i.e. from the relative position of the separation zone within the liquid examined. Such tests are performed in various fields of technology, natural science and medicine. If the settling action is rapid, its progress can be followed by observation and recording of the location of the separation zone. On the other hand, in tests extending over many hours and days observation is very difficult to perform reliably so that often only a few points of the progress are determined and the exact rate of progress and its fine structure disregarded.

In certain tests of this nature, e.g. in the observation of the sedimentation rate for medical purposes, a fully automatic device for the registration of the rate of progress is desirable.

The present invention relates to a device for measuring and recording the progression of the separation zone of different components in a mixed liquid. The device is characterized by a plurality of vertically disposed contiguous translucent containers or tubes designed to hold the liquid mixture and by recording means to be registered with each container, said recording medium being driven at a predetermined rate per unit time. One after the other, in automatic sequence, each of the containers is illuminated by a single light source arranged in front of it, and scanned by a photosensitive cell behind it, which cell is displaced along the length of the respective container axis. This longitudinal movement is transmitted to a stylus movable normally to the time abscissa of the associated recording device, which stylus is so controlled by the photosensitive cell that a sudden marked change in the light absorption of the mixture in the longitudinal scanning action on the container operated upon causes a mark to be placed at the corresponding ordinate value.

It is therefore an important object of this invention to provide means affording movement of measuring and recording elements commensurate with the distance and position of the respective containers whose contents of liquid mixtures are to be examined or scanned.

It is another object of the invention to provide means conducive to a relatively rapid, but highly accurate measuring and scanning operation for various liquid mixtures having different liquid phase levels.

Still another object of the present invention resides in the provision of means envisaging the action of various measuring instruments such as a light source, photosensitive cell, stylus and recording means relative to the respective container contents in timed coordination, automatic switch control means being further contemplated to influence the operation of the light source in the starting and terminal positions of the respective container to be subjected to examination.

It is still another object of the present invention to provide means contriving reliable cooperable parts of the measuring apparatus of the aforesaid type for use in laboratories, hospitals and experimental stations, where high efficiency, extreme economy and utmost accuracy in the use of such apparatus are an axiomatic prerequisite and are of prime importance.

Yet a further object of the invention is to provide means leading to an uncomplicated and easily manipulatable apparatus of the aforesaid nature, which may be operated either automatically or manually, even by unskilled laboratory help without being able to disturb preset measuring sequences.

These and other objects of the invention will become further apparent from the following detailed description, reference being made to the accompanying drawing showing a preferred embodiment of the invention.

The invention is described in connection with the single figure which illustrates an apparatus pursuant to the present invention, in a more or less diagrammatic manner.

The liquid mixture to be tested is contained in the vertically disposed translucent containers 1, which are arranged in contiguous relation in any desired number and are spaced apart a certain distance 1a. Each container or tube 1 is inserted in a mounting 1b provided for this purpose. It is assumed that the liquid mixture consists here of the two optically different components 2 and 3, which are increasingly separated in the course of time, the less transparent component 3 settling down at the bottom, and the clear component 2 being separated clearly from the component 3 by the stratification boundary 4. However, it will be understood that the present invention is by no means limited to the use of liquid mixtures consisting of turbid and less turbid components; it is also possible to use separating components of different colors.

The translucent container 1 is scanned by a beam 5 of light which is emitted in approximately horizontal direction from a light source 6, of any suitable design, through the diaphragm 7.

This light source 6 is arranged in front of the container 1 and the light beam is directed at a photoelectric cell 9, through a lens 8. The beam 5 causes the photoelectric cell 9 to respond unless the beam is reduced by the light absorption of the liquid component 3 to an intensity value which is below the sensitivity threshold of the cell 9. The photoelectric cell 9 actuates an electromagnetic recording device 50. As here shown, device 50 comprises the stylus 10 mounted at one end 51 of an iron bar 11 which is mounted for rotation about an axle 12. A tension spring 13 acts on the other end 52 of the bar 11 and biases the stylus 10 into operative position against a recording chart 21. An electromagnet consisting of the core 14 and the coil 15, when excited by the photoelectric cell 9—if necessary with the interposition of amplifying means of known design—attracts the end 52 of the bar 11 against the action of the spring 13, to move the stylus 10 to inoperative position disengaged from chart 21.

The light source 6, the lens 8, the photoelectric cell 9 and the recording device 50 are mounted by means of brackets 30, 31, 32 and 33 to a slide 34, arranged laterally of their optical axis.

The slide 34 is mounted for vertical displacement on two vertical guide rails 35. The guide rails 35, in turn, depend from a carriage 53, indicated diagrammatically by the beam 36 provided at each of its ends with an undercarriage 37 and rollers 38. By means of these rollers 38, the carriage 53 can run on the horizontal rails 39 over the filled containers 1, when the slide 34 is in its uppermost position. The slide 34 with the parts 6—15 secured thereon is raised and lowered in vertical direction, by conventional apparatus, along the container axis, as shown by the arrow 17, so that the containers 1 are scanned optically, from the bottom up, by the beam of light 5. This vertical scanning motion effects at the same time the recording, the stylus 10 moving along a generatrix of a cylindrical recording member 18, associated with the scanned container 1. The recording cylinder 18 associated with each container 1 is rotated about its axis 19, by conventional means, proportionally to the passage of time, for example, in the direction of the arrow 20, so that the recording tape 21, secured on the cylinder has a time abscissa $t$ and line marks 22 as ordinates.

In each vertical scanning motion from bottom up along the container 1, the stylus makes an ordinate mark as long as the photoelectric cell 9, and consequently, the magnet coil 15, is not energized. This energization only occurs when the stratification boundary 4 in the container 1 is passed, so that the stylus 10 is lifted by the magnet coil 15. The length of the ordinate mark 22 on the recording tape 21 thus indicates the height of the light-absorbing component 3 which is settling to the bottom of the container 1. Naturally an ordinate mark can be drawn inversely when the photoelectric cell 9 and the magnet coil 15 are energized.

Depending on the type of liquid mixture to be examined, one has to make sure, by the selection of a suitable light source 6 or by the assembly of color filters behind the diaphragm 7, that the light absorption is as high as possible in the settling liquid component 3 and as low as possible in the component 2, so that when the stratification boundary 4 is passed by the scanning beam, there is as great as possible a change of the light intensity in the cell 9. By known means for regulating the threshold value of the photoelectric cell 9, the intensity increase of the beam 5, when passing the stratification boundary 4, during the vertical scanning motion, can always be so adjusted that the stylus 10 is lifted at this point from the recording tape.

Apart from the vertical scanning motion of slide 34 and the parts mounted thereby, the unit 16, comprising the carriage 53 and the slide 34 with its mounted parts 6—15, also moves laterally of the various containers 1 and recording cylinders 18, arranged side by side, in the direction of the arrow 23. Mechanical and electric stopping means of conventional design are provided to ensure that the lateral motion in the direction of the arrows 23 stops when the scanning unit 16 has reached the correct position for scanning the following container 1 and the recording cylinder 18 associated with it. Preferably, the drive of the lateral shifting mechanism for the motion in the direction of the arrows 23 is effected by electric means and the engagement for the vertical scanning of the individual containers 1 is effected, for example, by breaking the circuit of the electric driving means. After the last of the juxtaposed containers 1 has been scanned, the drive is so reversed that the unit 16 returns automatically to its original position in front of the first container 1. Preferably the driving mechanism for the vertical scanning motion and the lateral shifting motion of the unit 16 are forcibly so coupled with each other that the vertical scanning process can only take place when the lateral shifting motion of the unit 16 is completed.

The present application is a continuation-in-part of my prior application Serial No. 442,010, filed July 8, 1954, now abandoned.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A device for measuring and recording the progressing separation zone of different components of a liquid mixture, comprising at least one translucent container having a vertical axis and disposed for holding said liquid mixture, recording means for said container, a light source for illuminating said container from one side of the latter, a photoelectric cell arranged at the opposite side of said container for receiving light transmitted therethrough, writing means adapted to be moved parallel to the axis of said container, means for displacing said cell vertically along said container to effect longitudinal scanning of the latter, a common support for said cell and said writing means for transmitting the vertical motion of said cell to said writing means to effect a concurrent displacement of the latter lengthwise of said container, and circuit means operatively interconnecting said photoelectric cell with said writing means for control of the latter by said cell, whereby a sudden marked change in the light absorption of said liquid in a container subjected to said longitudinal scanning action of said cell effects a corresponding change in the amount of light received by said cell to thereby enable the latter to impart a sudden change in the operation of said writing means to cause a sudden change in the writing action of said writing means on said recording means.

2. A device according to claim 1, said recording means for said container comprising a recording drum having an axis of rotation parallel to the vertical axis of said container, said drum being adapted for rotation proportionately to the passage of time about its axis of rotation.

3. A device according to claim 2, the spectral range of the light employed for optical scanning being predetermined with respect to the characteristics of said liquid mixture to be examined, whereby a marked change in light absorption is ensured when the separation line between said components is crossed during said scanning action by said cell.

4. A device according to claim 1, said vertical displacing means comprising slidable means on which are mounted said light source and said photoelectric cell in laterally spaced relation, and lens means mounted on said slidable means and located intermediate said cell and said light source.

5. A device for measuring and recording the progressing separation zone of different components of a liquid mixture, comprising at least one translucent container having a vertical axis and disposed for holding said liquid mixture, recording means for said container, a light source for illuminating said container from one side of the latter, a photoelectric cell arranged at the opposite side of said container for receiving light transmitted therethrough, writing means adapted to be moved parallel to the axis of said container, means for displacing said cell vertically along said container to effect longitudinal scanning of the latter, a common support for said cell and said writing means for transmitting the vertical motion of said cell to said writing means to effect a concurrent displacement of the latter lengthwise of said container, circuit means operatively interconnecting said photoelectric cell with said writing means for control of the latter by said cell, whereby a sudden marked change in the light absorption of said liquid in a container subjected to said longitudinal scanning action of said cell effects a corresponding change in the amount of light received by said cell to thereby enable the latter to impart a sudden change in the operation of said writing means to cause a sudden change in the writing action of said writing means on said recording means, and means for displacing said cell and said writing means laterally of said container for effecting the scanning and recording of the contents of a laterally disposed container.

7. A device for measuring and recording the progressing separation zone of different components of a liquid mixture, comprising at least one translucent container having a vertical axis and disposed for holding said liquid mixture, recording means for said container, a light source for illuminating said container from one side of the latter, a photoelectric cell arranged at the opposite side of said container for receiving light transmitted therethrough, writing means adapted to be moved parallel to the axis of said container, means for displacing said cell vertically along said container to effect longitudinal scanning of the latter, a common support for said cell and said writing means for transmitting the vertical motion of said cell to said writing means to effect a concurrent displacement of the latter lengthwise of said container, circuit means operatively interconnecting said photoelectric cell with said writing means for control of the latter by said cell, whereby a sudden marked change in the light absorption of said liquid in a container subjected to said longitudinal scanning action of said cell effects a corresponding change in the amount of light received by said cell to thereby enable the latter to impart a sudden change in the operation of said writing means to cause a sudden change in the writing action of said writing means on said recording means, means for displacing said cell and said writing means laterally of said container for effecting the scanning and recording of the contents of a laterally disposed container, said vertical displacing means being mounted by said lateral displacing means, said lateral displacing means comprising carriage means mounted for reciprocation laterally of said container, and said vertical displacing means comprising a vertical slide mounted by said carriage means.

6. A device for measuring and recording the progressing separation zone of different components of a liquid mixture, comprising at least one translucent container having a vertical axis and disposed for holding said liquid mixture, recording means for said container, a light source for illuminating said container from one side of the latter, a photoelectric cell arranged at the opposite side of said container for receiving light transmitted therethrough, writing means adapted to be moved parallel to the axis of said container, means for displacing said cell vertically along said container to effect longitudinal scanning of the latter, a common support for said cell and said writing means for transmitting the vertical motion of said cell to said writing means to effect a concurrent displacement of the latter lengthwise of said container, circuit means operatively interconnecting said photoelectric cell with said writing means for control of the latter by said cell, whereby a sudden marked change in the light absorption of said liquid in a container subjected to said longitudinal scanning action of said cell effects a corresponding change in the amount of light received by said cell to thereby enable the latter to impart a sudden change in the operation of said writing means to cause a sudden change in the writing action of said writing means on said recording means, means for displacing said cell and said writing means laterally of said container for effecting the scanning and recording of the contents of a laterally disposed container, said vertical displacing means being mounted by said lateral displacing means, said lateral displacing means comprising carriage means mounted for reciprocation laterally of said container, and said vertical displacing means comprising a vertical slide mounted by said carriage means, said light source, said cell and said writing means being mounted by said slide.

References Cited in the file of this patent
UNITED STATES PATENTS

| | | |
|---|---|---|
| 1,068,370 | Simpson et al. | July 22, 1913 |
| 2,091,303 | Brelsford | Aug. 31, 1937 |
| 2,104,525 | Proskouriakoff | Jan. 4, 1938 |
| 2,427,790 | Korman | Sept. 23, 1947 |
| 2,436,145 | Johnson | Feb. 17, 1948 |
| 2,725,782 | Worley | Dec. 6, 1955 |